United States Patent [19]

Ballestra

[11] Patent Number: 4,548,789
[45] Date of Patent: Oct. 22, 1985

[54] MONO-STAGE DEVICE TO GENERATE GASEOUS SO₃ FROM MELTED SULPHUR

[75] Inventor: Mario Ballestra, Milan, Italy

[73] Assignee: Ballestra S.p.A., Milan, Italy

[21] Appl. No.: 525,788

[22] Filed: Aug. 23, 1983

[30] Foreign Application Priority Data

Sep. 6, 1982 [IT] Italy ............................... 12617 A/82

[51] Int. Cl.⁴ ............................................. F01C 1/00
[52] U.S. Cl. .................................. 422/160; 422/192; 422/202
[58] Field of Search ........ 422/160, 192, 211, 188–191, 422/193, 198, 202

[56] References Cited

U.S. PATENT DOCUMENTS

| | | | |
|---|---|---|---|
| 2,127,561 | 8/1938 | Herrmann | 422/160 |
| 2,889,202 | 6/1959 | Johannsen et al. | 422/160 X |
| 3,257,174 | 6/1966 | Fournel | 422/160 |
| 4,296,088 | 10/1981 | Stauffer | 422/160 X |
| 4,335,076 | 6/1982 | McFarland | 422/192 X |

*Primary Examiner*—Thomas Wyse

[57] ABSTRACT

A mono-stage device for generating gaseous sulphuric anhydride from melted sulphur, of the kind having two chambers, one inside the other and preferably concentric. The internal chamber contains spherical refractory material and has a duct feeding hot air into the bottom of the chamber. It opens at its upper end into the external chamber. Molten sulphur is fed into the upper end of the inner chamber and is burned to form $SO_2$ which flows down in the external chamber containing catalytic material to form $SO_3$ which is extracted through an outlet near the bottom of the external chamber.

8 Claims, 4 Drawing Figures

U.S. Patent Oct. 22, 1985 4,548,789

MONO-STAGE DEVICE TO GENERATE GASEOUS SO₃ FROM MELTED SULPHUR

BACKGROUND OF THE INVENTION

It is well known that when coal with a sulphur content lower than 1% is burnt in an ordinary furnace, the amount of $SO_3$ which is naturally generated often is not enough to reduce the ashes resistivity to such an extent as to allow an electrostatic precipitator to operate.

Said resistivity extent is about $5/10^{10}$ ohm. cm. In such cases the ashes resistivity can be increased to an acceptable degree by adding a suitable additive, such as $SO_3$, apt to be combined with steam to generate $H_2SO_4$.

It must be pointed out that the amount of $SO_3$ required is relatively small, and is about 15 ppm with respect to the total weight of the smokes concerned.

Many serious problems always arise when $SO_3$ is employed, as it is very difficult a substance to be handled. Therefore, when a huge amount of $SO_3$ is to be used, it is usually preferable to generate it locally by melted sulphur combustion in the air, and afterwards by catalytically converting the $SO_2$ generated into $SO_3$. In such cases, in order to achieve a high ratio in the conversion of sulphur dioxide into sulphuric anhydride, the conversion must take place in a number of stages. Therefore the known plants apt to generate sulphuric anhydride by melted sulphur combustion prove unsuitable to be used, unchanged, to generate a small amount of gaseous sulphuric anhydride as required in combustion plants of the kind as above mentioned, particularly when coal is used as a fuel.

OBJECTS OF THE INVENTION

The purpose of the present invention is to provide a mono-stage device, with a constantly high percentage in the conversion of $SO_2$ into $SO_3$, to generate gaseous sulphuric anhydride to increase the resistivity of the ashes generated in a combustion plant, such as a thermoelectric plant, or the like.

The device, according to the invention, substantially provides two concentric chambers, through the first of which, the inner one, flows upwards a stream of air, preferably warm, gradually coming into contact with the melted sulphur flowing downwards and thus generating sulphur dioxide.

An assembly upper chamber allows the stream of gaseous mixture, containing an $SO_2$ volume concentration from 1% up to 12%, to flow backwards, directed towards the external annular chamber possibly through a tube-nest heat exchanger—or any other kind of heat exchanger—located in the upper part of the unit and apt to reduce the temperature of the combustion gases, depending on the $SO_2$ concentration, to the most suitable degree for the conversion. Said stream flows downwards through the external annular chamber. In said external annular chamber a suitable catalyst is contained, such as vanadium oxide, which allows the conversion of sulphur dioxide into sulphuric anhydride.

As it is well known, the best temperature for the sulphur dioxide conversion into sulphuric anhydride to take place is around 420° C./450° C.; however, a gradual heating of the gaseous mixture stream containing $SO_2$, during the $SO_2$ oxidation into $SO_3$, can hardly be avoided.

That causes a low conversion efficiency.

According to the invention, such a drawback can be obviated by placing, inside the external annular chamber, where the $SO_2$ conversion into $SO_3$ takes place, suitable cooling means, apt to keep the gaseous mixture temperature at the advantageous level of 420° C./450° C.

Such advantageous reaction temperature can be also kept constant by the catalyst layer, by introducing diluition air at a suitable temperature, from a number of different levels of the layer itself, as shown by arrows 32.

DESCRIPTION OF THE PREFERRED EMBODIMENT

Figure 1:
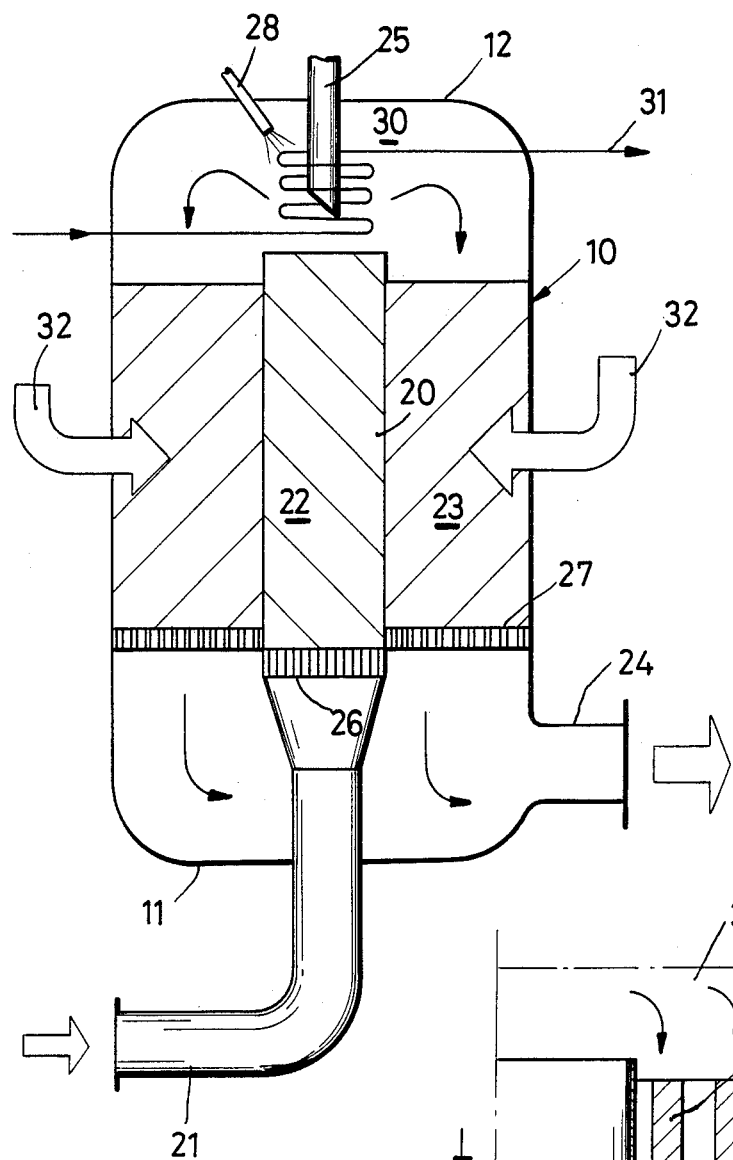
FIG. 1 is a sectional elevation view of a plant according to the invention.

With particular reference to said Figures: 10 indicates the external shell of the device, substantially cylindrically shaped, and closed on the upper part and on the bottom by endplates 11 and 12.

Inside the shell 10, preferably in the middle of it, there is a cylindric body 20, open at the top, and connected at the bottom with an air source, preferably dry, and preferably heated, via a duct 21, which is located along the end plate 11 of the shell 10.

The walls of the external shell 10 and of the internal cylinder 20 define two reaction chambers, one of which is substantially cylindrical and internal (22), and the second of which is substantially annular and external (23). Said reaction chambers are respectively the melted sulphur combustion chamber where the sulphur dioxide is generated, and the reaction chamber where the sulphur dioxide conversion into sulphuric anhydride takes place.

The gaseous mixture containing sulphuric anhydride is extracted from the reactor through a suitable duct 24, placed near the bottom of the shell 10.

Through the upper end plate 12, there is a descending duct 25, which opens up over the cylindric body 20, inside which it feeds the melted sulphur already proportioned.

Said melted sulphur is assembled on the surfaces of a number of refractory material spheres, filling up reaction chamber 22 and apt to distribute the melted sulphur fed by duct 25 as a film, so as to raise the ratio surface/volume of the sulphur fed, without making use of a spray feeding system, which would be inconvenient for a relatively small amount of material.

The refractory material of said spheres is preferably a refractory material with a high content of alumina; said material is supported by a grate 26 and fills the tubular body 20 up to the level qualitatively indicated by the dashed line in FIG. 1. A second grate 27 is placed substantially at the same level as grate 26 and is apt to support the catalyst which allows the $SO_2$ conversion into $SO_3$. In this case too the dashed line in the Figure, inside the annular reaction chamber 23, indicates the area which is filled up by said catalyst.

Said catalyst can advantageously consist of granulated material or anyway by a material having a wide faying surface, for instance a refractory material, whose surfaces are covered by the catalyst itself, for instance vanadium oxide.

Near the duct 25, feeding the melted sulphur, there is a burner 28, preferably a gas burner, apt to start the reaction of the melted sulphur combustion. It can therefore be used only at the beginning of the device operation.

The operation is the following:

Preferably dry air is fed through duct 21 and flows upwards through the inner chamber 22, along the gaps between the various spheres of refractory material which fill up said chamber.

A continuous layer of melted sulphur is fed by duct 25 on said spheres.

The combustion reaction, when started by gas burner 28, goes on by itself.

The initial sulphur ignition can also be caused by the high temperature of the air, possibly pre-heated, introduced through duct 21. Therefore, from the central or internal chamber 22 comes out a gaseous mixture, with a $SO_2$ volume content varying from 1% to 12%; such percentage value is determined by the ratio between the amount of air fed through duct 21 and the amount of melted sulphur fed through duct 25.

The temperature of the air fed through duct 21 shall be such as to allow, with respect to the heat generated by the melted sulphur combustion, the temperature of the gaseous mixture coming from the central chamber 22 to be almost equal to, or slightly lower than, the most suitable temperature for the $SO_2$ conversion into $SO_3$ to take place. Such temperature, as we above mentioned, is about 420° C./450° C.

When the $SO_2$ concentration in the gases is such that the combustion gases temperature is higher than the most suitable temperature for the conversion, the mixture shall be suitably cooled down by means of heat exchanger 31, so as to bring it back to the most suitable temperature for the conversion.

Such gaseous mixture is assembled in the upper chamber 30, defined by the upper level of the filling material of chambers 22 and 23, and it is made then to flow downwards, through exchanger 31, into external annular chamber 23, where the conversion takes place.

While said conversion reaction is taking place, the gaseous mixture temperature grows higher, which is what hinders the conversion reaction to be completed. Therefore, in order to obtain, in the device outlet, a gaseous mixture in which the conversion of $SO_2$ into $SO_3$ degree is virtually equal to the unit, the temperature inside annular chamber 23 must be controlled, so as to have it as constant as possible and as close as possible to the ideal temperature 420° C./450° C.

Alternatively, although with higher expenses as regards the implementation of the plant, the conversion chamber can be divided into a number of sections intercalated by suitable cooling chambers.

Figure 2:
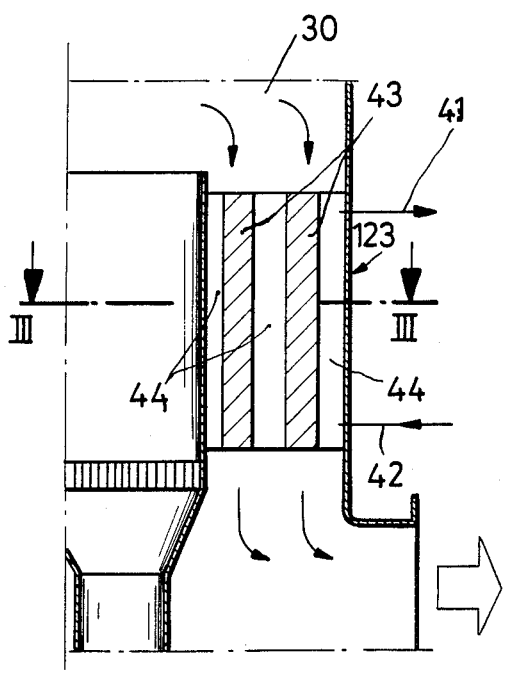
FIG. 2 is a view of an enlarged detail of the external annular chamber, in which the sulphur dioxide conversion into sulphuric anhydride takes place, and where the above mentioned cooling means are schematically shown.
Figure 3A:
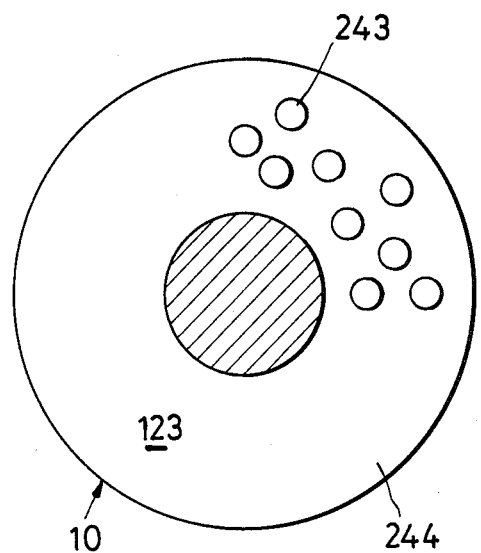
FIG. 3A is a sectional view along the section plane indicated with III—III in FIG. 2, according to a first embodiment.
Figure 3B:
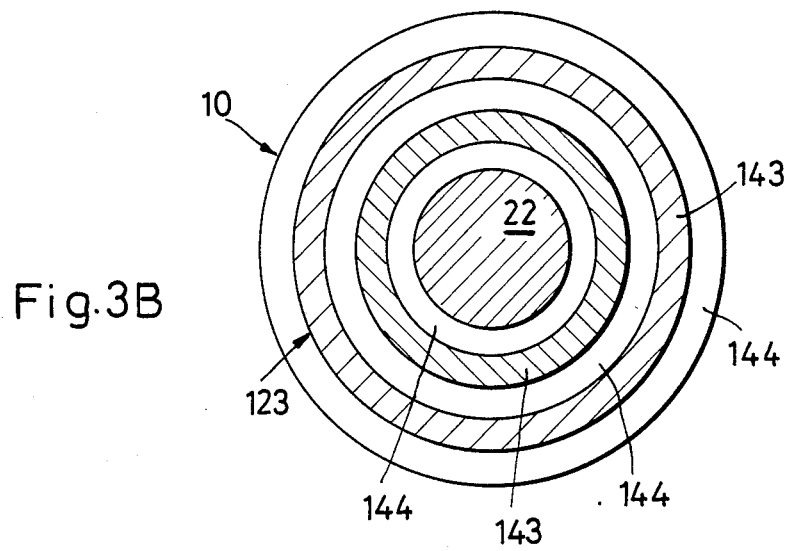
FIG. 3B is another sectional view along the section plane III—III in FIG. 2, of a second embodiment of the cooling system of the conversion external annular chamber.

The first solution mentioned, consisting of a control over the temperature inside the annular chamber 22, can be achieved, for instance, according to one of the two embodiments shown in FIGS. 2, 3A, 3B. With particular reference to said Figures: the annular chamber 123 is divided into two sets of vertical ducts, with both the function of allowing the flow of the gaseous mixture coming from the upper chamber 30 and during the conversion, and of allowing the flow of a cooling fluid fed and gathered by ducts 41 and 42.

Therefore, the annular chamber 123 must be defined on its upper surface and on its bottom, by two end plates on which vertical ducts 43 are provided, said ducts being filled up with the catalytic material and in said ducts flowing the gaseous mixture. Between ducts 43 spaces 44 are defined, in which a cooling fluid is contained.

In the constructive solution shown in FIG. 3B, the gaseous mixture flows through annular ducts 143, while the cooling fluid through the corresponding annular ducts 144, placed between the above mentioned annular ducts; in the solution shown in FIG. 3A, the vertical ducts through which the gaseous mixture is to flow, consist of cylindrical pipes 243, around which, in 244, the cooling fluid flows.

One of the advantages of the present invention consists of a common wall between the first chamber, the central one, and the second annular chamber. In the first chamber, the central one, the combustion of the sulphur flowing downwards against the flow of the comburent gas takes place; in the central chamber, therefore, $SO_2$ is generated. In the annular external chamber, the $SO_2$ catalytic conversion into $SO_3$ takes place. The common wall between the two chambers increases the efficiency of the plant, according to the following explanation: It is well known that an increase in the temperature is thermodynamically disadvantageous to the equilibrium of the exothermic reaction of the sulphur dioxide oxidation into sulphuric anhydride.

It is also well known that the reaction speed (or the catalyst activity) is greatly increased by an increase in the temperature. Therefore it is necessary to balance said opposite trends when choosing the inlet temperature in an adiabatic catalytic bed. (usually it operates at 420° C.–450° C.). In the reactor as claimed, the temperature ($T_4$) of the gases coming out of the catalytic bed depends only on the ratio between the amount of sulphur and the amount of air, and on the air inlet temperature ($T_1$) together with the sulphur inlet temperature ($T_2$). The inlet temperature into the catalytic bed ($T_3$) depends also on the heat exchange between the catalytic bed and the combustion area, that is to say between the central chamber and the external annular chamber.

The temperature is higher in the area where the catalyst is located (external annular chamber), therefore the heat is transmitted from that area to the combustion area (central chamber).

As a result, the outlet temperature from the catalytic bed (that is from the external annular chamber) being the same, a higher inlet temperature is obtained in said annular external chamber.

Therefore, according to what is mentioned above, a higher reaction speed at the beginning of the catalyst layer filling the external annular chamber is obtained.

Drawing the conclusions, it can be said that the regulation of the outlet temperature from the catalytic bed is advantageous to the oxidation system.

Consequently in the claimed reactor, the sulphur oxidation reaction into $SO_2$ takes place in the central area, the flow being upwards. The $SO_2$ catalytic oxidation into $SO_3$ takes place in the external annular area, where the catalyst is located, the gas flow being downwards.

In the central area the gas flows in the opposite direction of the gas flowing in the annular area, the former receiving heat from the latter and thus having a positive effect on the catalyst activity.

Although the invention has been described with reference to what above disclosed and shown, by way of example only, many modifications and equivalents can be accepted in realizing the invention; said modifications and equivalents being however within the scope of the appended claims.

What we claim is:

1. A mono-stage device for generating gaseous sulphuric anhydride from melted sulphur comprising,
    a first chamber containing filling material providing a large surface area, means for introducing melted sulphur into an upper end of said first chamber to flow down over said filling material, means for introducing air into a lower end of said first chamber, means for initially igniting said sulphur, whereupon said sulphur is burned to produce combustion products comprising sulphur dioxide,
    a second chamber contiguous with said first chamber and containing catalytic material providing a large surface area, means for connecting the upper end of said second chamber with the upper end of said first chamber for flow of said combustion products from said first chamber into said second chamber and down through said catalytic material in said second chamber for conversion of sulphur dioxide into sulphuric anhydride, and means for discharging conversion products comprising sulphuric anhydride from a lower end of said second chamber,
    said first and second chambers having a common heat-conducting wall for thermal transfer between said chambers.

2. A mono-stage device according to claim 1, in which said first chamber is cylindrical and said second chamber is annular and surrounds said first chamber, said common wall being a cylindrical wall of said first chamber which is also an inner wall of said second chamber.

3. A mono-stage device according to claim 2, in which said means for connecting the upper end of said second chamber with the upper end of said first chamber comprises a domed cover over said chambers, said means for feeding melted sulphur comprising a feed duct extending through said cover.

4. A mono-stage device according to claim 3, further comprising a heat exchanger surrounding said duct.

5. A mono-stage device according to claim 2, in which there is provided in said annular second chamber a passageway through which a temperature-controlling fluid is circulated.

6. A mono-stage device according to claim 1, in which said filling material comprises a multiplicity of spheres of different sizes of refractory material.

7. A mono-stage device according to claim 1, in which said catalytic material comprises particulate refractory material coated with a catalyst.

8. A mono-stage device according to claim 7, in which said catalyst is vanadium oxide.

* * * * *